US009945952B2

(12) United States Patent
Arcidiacono et al.

(10) Patent No.: US 9,945,952 B2
(45) Date of Patent: Apr. 17, 2018

(54) METHOD OF GEO LOCALIZATION OF A TERMINAL SENDING A SINGLE SIGNAL TO A SATELLITE SYSTEM

(71) Applicant: EUTELSAT S A, Paris (FR)

(72) Inventors: Antonio Arcidiacono, Paris (FR); Daniele Vito Finocchiaro, Paris (FR); Alessandro Le Pera, Issy-les-Moulineaux (FR)

(73) Assignee: EUTELSAT S A, Paris (FR)

( * ) Notice: Subject to any disclaimer, the term of this patent is extended or adjusted under 35 U.S.C. 154(b) by 807 days.

(21) Appl. No.: 14/083,745

(22) Filed: Nov. 19, 2013

(65) Prior Publication Data
US 2014/0145877 A1    May 29, 2014

(30) Foreign Application Priority Data

Nov. 27, 2012   (EP) .................................... 12194443

(51) Int. Cl.
| | | |
|---|---|---|
| G01S 19/05 | (2010.01) | |
| G01S 19/00 | (2010.01) | |
| G01S 5/02 | (2010.01) | |

(52) U.S. Cl.
CPC ................ G01S 19/00 (2013.01); G01S 5/02 (2013.01); G01S 19/05 (2013.01)

(58) Field of Classification Search
CPC ...................................................... G01S 19/00
See application file for complete search history.

(56) References Cited

U.S. PATENT DOCUMENTS

| | | | | |
|---|---|---|---|---|
| 4,740,792 A | * | 4/1988 | Sagey ................... | G01S 5/0009 342/357.31 |
| 4,897,661 A | * | 1/1990 | Hiraiwa ................ | G01S 13/878 342/357.31 |
| 5,017,926 A | * | 5/1991 | Ames ...................... | G01S 5/14 342/353 |
| 5,327,144 A | * | 7/1994 | Stilp ........................ | G01S 3/46 342/387 |

(Continued)

FOREIGN PATENT DOCUMENTS

| | | |
|---|---|---|
| FR | 2 975 846 | 11/2012 |
| WO | WO 97/11383 | 3/1997 |
| WO | WO 98/14797 | 4/1998 |

OTHER PUBLICATIONS

Ho et al ("Solution and Performance Analysis of Geolocation by TDOA") IEEE Transactions on Aerospace and Electronic Systems, vol. 29, No. 4, Oct. 1993.*

(Continued)

*Primary Examiner* — Gregory C. Issing
(74) *Attorney, Agent, or Firm* — Pillsbury Winthrop Shaw Pittman LLP

(57) ABSTRACT

A method for localizing a terminal includes transmitting the signal by the terminal; receiving the signal by a first and a second satellite; transmitting the signal from each satellite to a receiving station; demodulating the signal received by the first satellite to determine a signal content and the time of arrival of the signal transmitted by the terminal at the receiving station via the first satellite; determining the time of arrival of the signal transmitted by the terminal at the receiving station via the first and second satellite; determining a position for the terminal by triangulation.

16 Claims, 4 Drawing Sheets

(56) References Cited

U.S. PATENT DOCUMENTS 6,282,231 B1 * 8/2001 Norman .................. G01S 19/21
342/159
8,583,915 B1 * 11/2013 Huang ................ H04L 63/0869
713/155

OTHER PUBLICATIONS

W. Gerok, J. Peissig and T. Kaiser, "TDOA assisted RSSD localization in UWB," 2012 9th Workshop on Positioning, Navigation and Communication, Dresden, 2012, pp. 196-200, Conference Date Mar. 2012.*
R. T. Juang, D. B. Lin and H. P. Lin, "Hybrid SADOA/TDOA Mobile Positioning for Cellular Networks," in IET Communications, vol. 1, No. 2, pp. 282-287, Apr. 2007.*
European Search Report and Search Opinion as issued for European Patent Application No. 12194443.3, dated May 14, 2013.

* cited by examiner

METHOD OF GEO LOCALIZATION OF A TERMINAL SENDING A SINGLE SIGNAL TO A SATELLITE SYSTEM

CROSS REFERENCE TO RELATED APPLICATIONS

This application claims the benefit of priority from European Patent Application No. 12194443.3 filed on Nov. 27, 2012, the entire content of which is incorporated herein by reference.

FIELD

The present invention relates to a method to determine with certainty the position on the earth surface of a satellite terminal transmitting a single signal to a satellite. The method is suitable for use within a specialized mass-market service: low cost of the terminal, limited use of satellite bandwidth, compatibility with other commercial services.

BACKGROUND

The usual positioning system is for the terminal to determine its position thanks to GPS signal by measuring signals emitted by the Global Positioning System satellite network, then to report this information to the hub via any communication network (cellular, satellite . . . ).

Other systems exist, which use an hybrid approach, where the terminal measures some properties, e.g. the delay in the reception of pilot signals from two different satellites, and sends the results to the Network operating center (NOC) via a telecom network, e.g. satellite itself; in a second phase the Network operating center uses these measurements to calculate the terminal position.

Note that all methods described above require an active "collaboration" by the terminal, and rely on the exactness of the information provided by the terminal to the hub. The drawback in this scenario is that the terminal may report a false position or report false information so that the network operating center calculates a false position, and the network operating center has no way to certify the truth of the information. Within an application involving payments, or tracking dangerous goods, it is possible that "pirate" terminals are developed that intentionally report a false position so as to avoid or reduce payments; these pirate terminals would be undetectable by the network operating center.

Besides, in satellite environment, sophisticated methods exist to perform triangulation and locate, within ~100 km, the position of a source of interference or jamming. These methods are very expensive, as they require sophisticated material as well as access to different satellites in order to perform triangulation. Also, they are based on a long period of observation of the signal. They cannot be used for single signal or in the framework of a consumer service.

The document FR no 1154663 proposes a solution based on measures of relative amplitudes. That invention requires the use of a multi-beam satellite, and the precision highly depends on the geometry of the beams operating on a same frequency band. This requirement restricts its applicability to few satellite systems in the world. Also, the problem of "impersonation", i.e. a terminal pretending to be another one, was not addressed.

SUMMARY

An aspect of the invention relates to a method that is based on a triangulation using at least two satellites and the different time-of-arrivals (TOA) of a single signal from the terminal. In order to reduce bandwidth usage, spectrum is shared among all terminals, and special techniques are employed to guarantee that the signal is recovered and TOAs are computed with sufficient precision even with very limited signal power and duration.

An aspect of the present invention aims at providing a method of geo localization of a terminal sending a signal to a satellite wherein the terminal cannot cheat, report a false position nor impersonate another terminal.

Another aspect of the present invention is to propose a method to geo localize a terminal sending a short duration signal.

Another aspect of the present invention is to propose a method of geo localization which is not expensive, simple and which can be performed by using normal telecommunication satellites, already in use.

To this purpose, an embodiment of the invention relates to a method of localization of a terminal sending a signal to a first satellite, the method using at least a second satellite, the method comprising:
  (a) Transmission of the signal by the terminal;
  (b) Reception of the signal by the first and the second satellites;
  (c) Transmitting the signal from each satellite to a receiving station;
  (d) Demodulating the signal received by the first satellite to determine a signal content and the time of arrival of the signal at the receiving station via the first satellite;
  (e) Determining the time of arrival of the signal via the second satellite by using the signal content and propagation properties determined thanks to the demodulation of the signal received via the first satellite;
  (f) Determining the set of possible positions of the terminal by triangulation by using the difference of time of arrival of the signal to be received by the receiving station via the first and the second satellites, as depicted in operation 730 of the method disclosed in FIG. 7.

By time of arrival of the signal at the receiving station via the first satellite, we mean the instant in time when the signal has been received by the receiving station via the first satellite. That time of arrival is also called "ToA".

An embodiment of the invention is particularly beneficial since the terminal is localized thanks to physical properties of the transmitted signal and then the method does not depend on the terminal measurements or computations, and consequently, the terminal cannot "cheat" and report a false position, nor impersonate another terminal.

Beneficially, the signal emitted by the terminal is a short duration signal or burst signal, i.e. a single signal. More precisely, by "short duration signal", or burst signal or single signal, we mean a signal with a duration of less than 1 second, so that the signal has a temporal duration which does not permit to third users to correctly demodulate/decode it. The time of transmission being unpredictable, the probability for a third party to track it is very close to zero.

Moreover, in an embodiment, the signal is desirably a low power signal, i.e. emitted by the terminal with an RF or Radio-Frequency power less than 5 W in Spread Spectrum. Therefore, the signal power belongs to the Spread Spectrum domain where, thanks to the embedded Processing Gain, the signal total power can be lowered down to a level where the signal itself is undistinguishable from thermal noise. As such, the probability to be detected by third parties is close to zero.

According to an embodiment of the invention, the signal includes at least a terminal identifier in order to avoid that the terminal impersonates another one. The terminal identifier contains desirably a cryptographic element that guarantees that the terminal is not "impersonating" another one. Usually this is done by a digital signature on a random part of the message, or using a sequence generated via a secret seed.

Beneficially, the signal is modulated according to a spread-spectrum technique.

In an embodiment, the method further includes a procedure of calibrating enabling to determine the precise position of the satellites in order to improve the precision of the localization method.

In an embodiment, the signal content determined while demodulating the signal comprises:
  The data embedded in the signal;
  The spreading code and/or the emission parameters of the signal.

In an embodiment, the method further comprises a procedure of detecting the signal received by the receiving station via the second satellite by using the signal content determined during the procedure (d) of demodulation. As a matter of fact, the signal received by the receiving station via the second satellite can be at very low power, and it would be difficult to detect it without knowing the signal content.

Beneficially, the procedure of determining the time of arrival (ToA) of the signal at the receiving station via the second satellite by using the signal content comprises a procedure of correlation between the aggregate signal received from the second satellite and a clean copy of the signal emitted by the terminal, regenerated from the demodulated content at procedure (d). In order to maximize performance i.e. to be able to demodulate this signal even in very weak link conditions on second satellite, the correlation can be done at chip level i.e., the spreading sequence modulated by the information bits.

According to a first embodiment, the method further comprises:
  Reception of the signal by a third satellite,
  Determining the time of arrival of the signal at the receiving station via the third satellite by using the signal content determined thanks to the demodulation of the signal received by the first satellite;
  Determining the position of the terminal by triangulation by using the difference in time of arrival of the signal at the receiving station via the first, the second and the third satellite.

According to a second embodiment, the method further comprises:
  Computing the amplitude of the signal when received via the first satellite;
  Computing the amplitude of the signal when received via the second satellite, or via a different beam of the first satellite;
  Determining the position of the terminal by triangulation by using:
    the difference in time of arrival of the signal at the receiving station via the first and the second satellites;
    the difference in amplitude of the signal when received by the first and the second satellites or beam, knowing the coverage maps of the two satellites or beams.

According to that second embodiment, the present invention is combined with the power-based system of the method disclosed in the document FR no 1154663: for example, using power difference on only two beams will already provide a "line" on which the terminal must be located; adding a time of arrival difference on two satellites will provide another "line", that together with the previous one will locate a the terminal. So, instead of using three beams like in the document FR no 1154663 or three satellites like in the first embodiment of the invention, the second embodiment of the invention uses two beams and two satellites, where the two beams may belong to a same or two different satellites.

Another aspect of the invention concerns a system to perform the method according to the first aspect of the invention, the system comprising a receiving station comprising at least a receiving part and a processing unit.

According to one embodiment, the receiving station comprises one or several of the followings:
  a first receiving part to which the signal coming from the first satellite is transmitted, and
  a second receiving part to which the signal coming from the second satellite is transmitted;
  a third part to which the signal coming from the third satellite is transmitted.

According to another embodiment, the receiving station comprises a single receiving part enabling to receive the signal coming from all the satellites. The first, second and third receiving parts can each comprise a physical receiver and/or one or more electronic modules (controller(s), processor(s)).

The receiving station can also comprise a processing unit performing the procedures (d), (e), (f).

In an embodiment, the receiving station is terrestrial.

In an embodiment, the receiving part(s) of the receiving(s) station(s) and/or the computing unit are formed by network operating center(s) and/or hub(s).

According to an embodiment of the invention, the method presents the following features:
  1. the reception of different copies of a single signal (burst of short duration) emitted by the terminal, via different satellites;
  2. the comparison of the relative times of arrival of the received copies of the same signal;
  3. a method to recover the terminal signal in channels where its amplitude is very low and not detectable without the use of the proposed method, so that low-power emitters can be used;
  4. the use of a 'normal' telecommunication satellites, such as C-band or K-band, so that a service can be deployed without a dedicated constellations of satellites;
  5. the superposition of signals of different users, allowing a very low usage of bandwidth which reduces costs and make the system compatible with a normal communication system (such as one based on the ETSI S-MIM standard);
  6. the use of cryptographic properties to guarantee that a terminal cannot "impersonate" a different one.

Besides the method according to an embodiment of the invention is unique in its functional properties because:
  1. the receiving station determines terminal location with a high degree of confidence, as no collaboration is required from the terminal, which could try otherwise to alter its apparent position;
  2. due to low costs of equipment and bandwidth, it allows to deploy a commercial consumer service based on this localization system.

DETAILED DESCRIPTION

Figure 1:
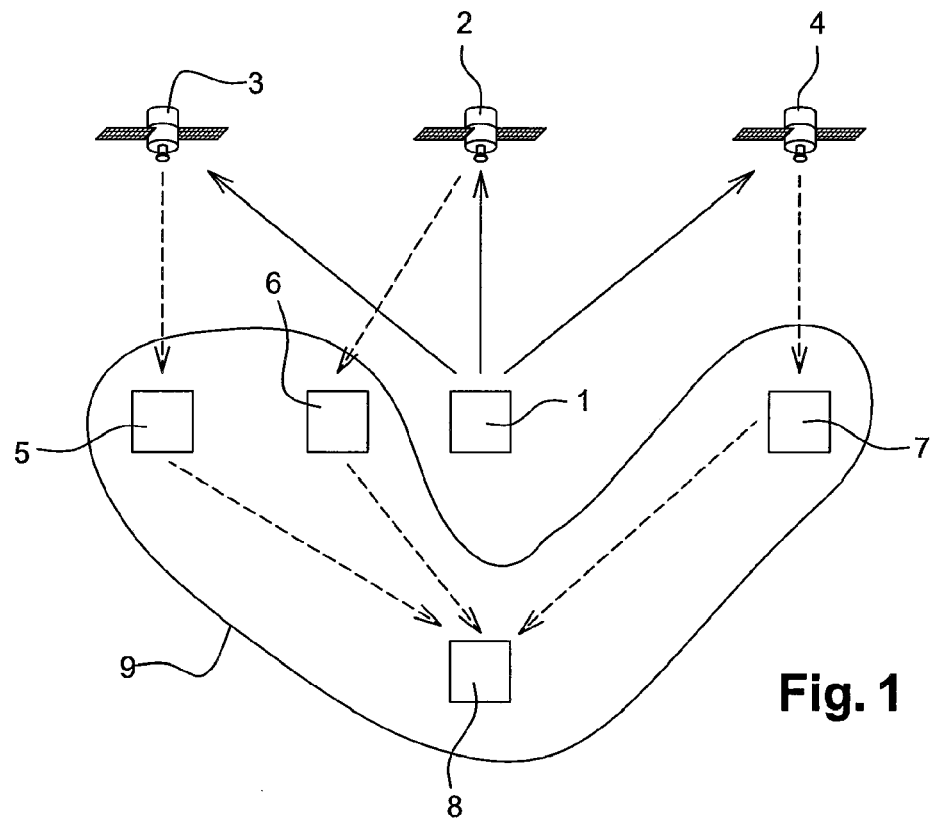
FIG. 1 represents a system to setup a method according to an embodiment of the invention.

Today there are many satellites in GEO orbit conceived for telecommunication purposes. In order to exploit at the maximum the available spectrum, some frequency bands, notably C, Ku and Ka-band, are reused from different positions. A terminal wanting to communicate shall use a high-gain antenna, e.g. a dish, in order to send/receive signals to/from a single satellite, limiting interference to other satellites that are reusing the same frequency in the same region. In some other bands, e.g. S-band, frequency reuse is less likely. However, there could be different satellites operating on the same region and frequency for backup purposes, or some regions could be covered by a 'primary' satellite, also called first satellite 2 and with a much lower performance by a secondary satellite 3, also called second satellite 3.

The purpose of an embodiment of the invention is to exploit the "interference" signal generated by a terminal transmitting towards the first satellite 2, but received also by other satellites: in that embodiment by the second satellite 3 and the third satellite 4. By using the techniques described hereafter, the signal is low enough not to harm communication services on the secondary satellites, but strong enough so that it can be found in the feeder links of the secondary satellites 3, 4 and measured by network operating center 8. Finally, by measuring the difference in time of arrival between signals in the primary satellite 2 and at least two secondary satellites, i.e. the second satellite 3 and the third satellite 4, the network operating center 5 is able to approximately locate the transmitting terminal by simple triangulation.

This system is conceived for using existing geostationary (GEO) telecommunication satellites. However, it will be appreciated that "dedicated" satellites that are somehow optimized for this system could be used in the future. For example, these could be a constellation of low-Earth-orbit (LEO) satellites conceived to offer three return channels in the same frequency in the region of interest.

Note that the system relies on the use of the "return link" which is usually less expensive than the "forward link" of a satellite, where high EIRP (Effective Isotropic Radiated Power) is required from the satellite, thus high power consumption and high costs for the satellite. This means that in the future some "return-link only" payloads might be deployed on new satellites, at low marginal costs, in order to allow a larger deployment of this service.

A main principle of the method according to the first embodiment of the invention is simple triangulation: to measure the exact times at which a single short signal or burst signal emitted from a terminal is received through at least three different satellites; the difference among the measured times of arrival, plus information on the exact position of the satellites, is then used to identify a small region on the Earth surface within which the signal was transmitted: in other words, it identifies a point but with a certain approximation.

Difference in time of arrivals is due to the fact that the paths from the terminal to the receiving station 9 via the three satellites 2, 3, 4 have different lengths. Measuring the difference in time of arrival corresponds to measuring the difference of path lengths. As the satellite positions are known, either from satellite control center, or using pilot signals from known terminals, a triangulation can be performed. The main difficulty to be solved is to measure with sufficient precision the time of arrival of signals received with a very low carrier-to-noise ratio (C/N). This problem is specifically addressed with the techniques exposed in this document.

Also, a terminal 1 may try to "impersonate" another one, i.e. sending a signal pretending to be another terminal. This is avoided by imposing that each terminal authenticates itself by sending, embedded in the message, a cryptographic sequence based on a secret seed, shared only by the terminal and the network operating center.

Besides, a relevant step is the possibility to determine a burst's signal Time of Arrival (ToA) with sufficient precision within an operating scenario not optimized for such measurements. In other words, the system is designed to work in presence of the satellite nominal communication signals, without creating interference and without being interfered by. To achieve such a goal, the use of Spread Spectrum Direct Sequence technique has been chosen.

Furthermore, an extension of the system could be towards the adoption of specialized satellite transponders, i.e. fully devoted to this service, so without any other communication signal, in which case the necessary evolution of the protocol goes towards existing techniques of Multi-Access-Interference rejection such as the asynchronous messaging protocol described in part 3 of the ETSI S-MIM standard (ETSI TS 102 721-3).

The following aims to provide the really basic procedures to achieve the geo-localization of a terminal 1. For ease of discussion, three satellites 2, 3, 4 are considered, sufficiently away from each other along the orbital arc, their transponders being able to receive the burst signal within the same up-link frequency.

1. The user terminal 1 transmits a low-power burst signal, as depicted in operation 700 of the method disclosed in FIG. 7;
2. this burst signal is received by the three satellites 2, 3, 4, as depicted in operation 705 of the method disclosed in FIG. 7, and is down-linked towards the receiving station 9, as depicted in operation 715 of the method disclosed in FIG. 7, with three separate feeder links, possibly at different frequencies;
3. the processing unit 8 will demodulate the highest-power message first, i.e. the message received by the first satellite 2, as depicted in operation 720 of the method disclosed in FIG. 7. This demodulation implies burst signal detection, de-spreading and data demodulation. The processing unit 8 is able to determine a time of arrival with an accuracy of one chip, as is further depicted in operation 720 of the method disclosed in FIG. 7, thanks to the good quality of the signal which is high C/N. The processing unit may comprise one or more physical processors to carry out its operation(s).

Figure 7:
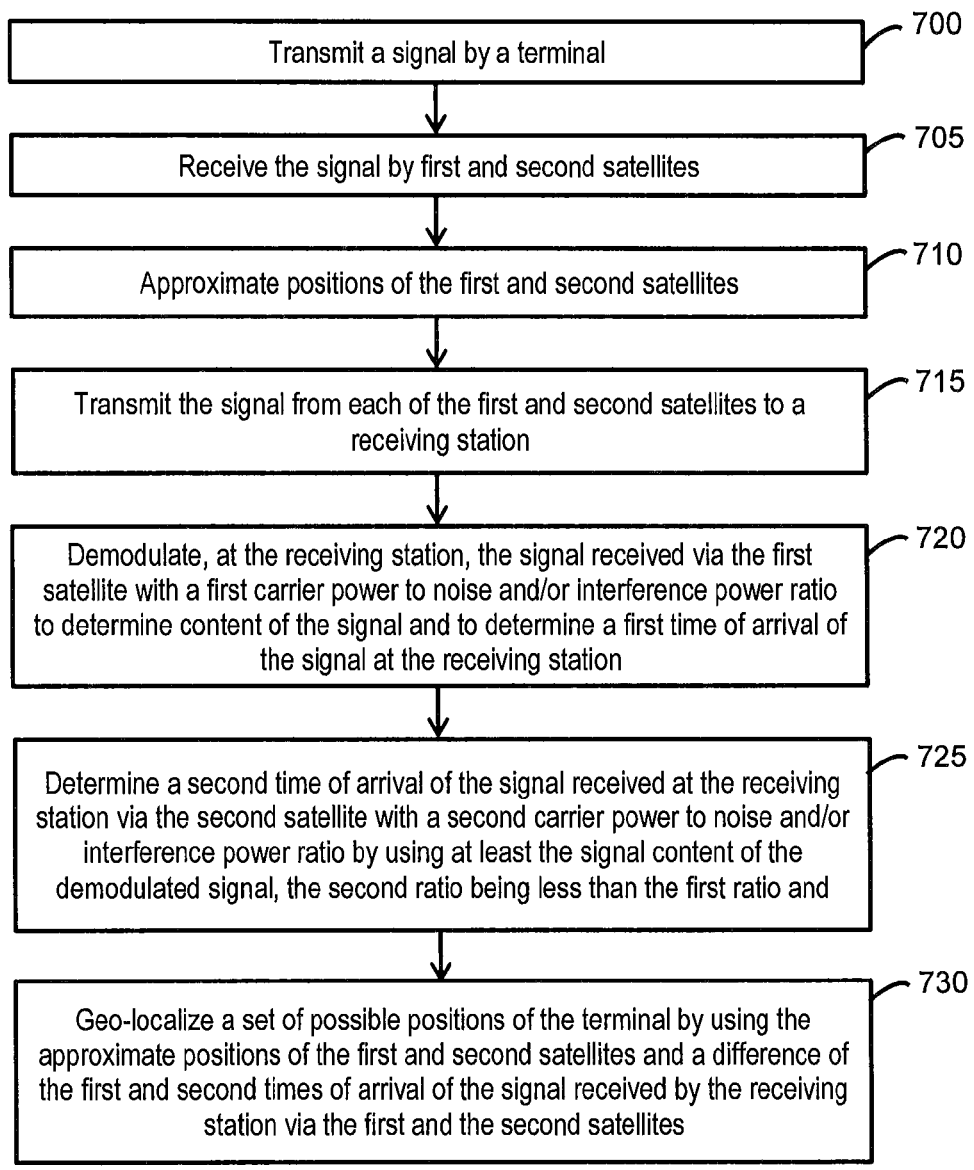
FIG. 7 is a flowchart showing a method for geo-localizing a set of possible positions of a terminal.

4. once the full burst signal is known, the entire spread signal, i.e. the data+the spreading code+additional transmission parameters, is used to detect the other two messages as received via the second and the third satellites 3, 4 with a worse quality, i.e. low C/N, as depicted in operation 725 of the method disclosed in FIG. 7. One possible way is to regenerate the signal corresponding only to the demodulated signal, and perform a cross correlation with the aggregate signal received on the second and the third satellites 3, 4, looking for a peak. This data-aided detection is able to provide the times of arrival with an accuracy of one chip, as is further depicted in operation 725 of the method disclosed in FIG. 7, thanks to the massive digital processing applied.

5. finally, the geo-localization of the terminal 1 is obtained by projecting the three lines of position obtained thanks to the difference of the three times of arrival along the Earth surface and triangulating the related slant ranges.

6. Although the position of the satellites is known with a reasonable approximation by the satellite operator, as depicted in operation 710 of the method disclosed in FIG. 7, the calibration of the system by means of Pilot transmitters, located in known positions, is assumed mandatory in order to achieve sufficient precision. The number, location and repetition cycle of such Pilots are dependent on the specific use case.

In order to design an optimized signal structure, it is worth to mention that the Chip rate shall be maximized with respect to the available transponder bandwidth, the data packet shall be limited to carry on the user identification only, i.e. generated by a cryptographic sequence based on a secret seed, and the pseudo-noise (PN) sequence length shall be as well maximized, since possibly its repetition cycle should correspond to the entire message duration so as to optimize auto-correlation properties. Such a signal structure, for which an example will be provided in the C-band use case, permits to optimize the performance in terms of accuracy leading to consider one chip precision of each satellite.

Detailed Description of the Procedures of the Method According to the First Embodiment of the Invention The procedures involved in the execution of the process are:

1. A procedure of signal transmission by the terminal 1: the terminal transmits a single burst signal (message) of short duration, with a specific format, which includes at least a unique identifier of the terminal, using a frequency shared by the satellites 2, 3, 4. Note that:
   a. The identifier of the terminal 1 desirably contains a cryptographic element that guarantees that the terminal is not "impersonating" another one. Usually this is done by a digital signature on a random part of the message, or using a sequence generated via a secret seed.
   b. the antenna used by the terminal 1 shall be near-omnidirectional, e.g. providing the same Gain in each azimuth direction, in order to allow the three satellites 2, 3, 3 to receive the signal. Details depend on the frequency band and link budget.
   c. for some applications, e.g. fixed installation, a parabolic antenna with high gain could be used, which allows a very good reception from the 'primary' satellite, and a poor, but still usable, reception on the secondary satellites, as long as they reside on lobes of the antenna pattern;
   d. as a benefit of using a Spread Spectrum signal, the Satellite transmit power of the emission is such that a negligible amount of interference is generated on satellites on other orbital positions, not directly used by this system.

2. A procedure of receiving the signal by the three satellites 2, 3, 4: that procedure may occur as follows: the signal is received at the three satellites 2, 3, 4, amplified, translated in frequency and replicated in their 'feeder links', i.e. from satellites to receiving station 9, using normal bent-type transponders.
   a. Note that the amplitude of the signal received at each satellite 2, 3, 4 depends on the Satellite transmit power transmitted by the terminal towards that satellite, and the G/T (the G/T being a figure of merit which provides the radio between the receive gain of the antenna versus the Thermal Noise reported in input to the repeater) of the satellite antenna towards the terminal;
   b. Consequently, the amplitudes of the three signals may vary considerably from one feeder link to the other; the system is designed in such a way that the resulting C/(N+I) (i.e. ratio between carrier power and noise plus interference power) is good for at least the first satellite 2 and lower for the secondary satellites, i.e. the second and the third satellites 3, 4;

3. A procedure of transmitting the three signals coming from the three satellites to the receiving station 9: that procedure may occur as follows: the receiving station 9 receives the three signals corresponding to the three beams and demodulates the signal received from the first satellite 2.
   a. the receiving station 9 is equipped with three RX antennas, each one pointed towards a single satellite. Implementation with different, far-located hubs is simply a matter of synchronizing the hubs, using a common time reference in all computations, and taking into account the different locations in the geometric computations.
   b. The signal received from the first satellite 2 which is the signal with highest level is demodulated first:
      1. assuming that the hub 5 is able to detect and demodulate only the signal from primary satellite, it performs signal detection, de-spreading and chip rate exact synchronization, in time and frequency, by maximizing auto-correlation peak.
      2. once de-spread, the data are demodulated and full signal is known: the signal content obtained is the data of the signal, the spreading code and the channel parameters of the first satellite 2;
      3. by using Pilot retrieved information relevant to the first satellite 2, the receiving station 9 is able to minimize inaccuracies due to:
         1. satellite frequency error;
         2. satellite Doppler due to orbital box movement;
         3. time to transfer of the signal through the satellite transponder;
         4. the time of arrival associated to the primary satellite is known with an accuracy with respect to the spreading code of as a minimum one chip. In addition, the hub 5 exploits a first estimation of the user-induced Doppler by direct measurement of the local chip rate at the end of the auto-correlation maximization. The frequency shift, in terms of net chip rate, is the sum of the satellite frequency error, its Doppler and the user-induced Doppler.

4. A procedure of computation of the time of arrival of the signal at the second and the third satellite 3, 4: that procedure may occur as follows: the full knowledge of the message content is used to estimate the TOAs of this message in the signals coming from the secondary satellites, even if the link budget is worse.
   a. the approach is to perform an auto-correlation on the received data by using the already known message as local PN replica.
   b. Due to geometric properties of the Earth surface, the time window where the correlation has to be searched is limited, i.e. the signal is received via the second satellite only a fraction of second before or after the instant at which it is received by the first satellite.
   c. By correcting the known message by the secondary satellite frequency error and Doppler, known thanks to the Pilot, and introducing an estimated user-induced Doppler, the residual frequency shift between the locally applied PN and the received signal is sufficiently small to permit detection and auto-correlation maximization. The time-to-transfer relevant to the secondary satellites is as well recovered as known from the Pilot.
   d. Once the auto-correlation is maximized, the time of arrival is known with an accuracy of at least one chip time on both the secondary satellites.
   e. Roughly speaking, 'finding' the time of arrival of the signal consists in performing a large correlation and finding a peak. Due to the nature of the service, this does not need to be performed in real time. The length of the process depends on the algorithms used and the computational power of the receiving station 9.

5. A procedure of Triangulation: that procedure may occur as follows: the receiving station 9 can locate the terminal 1 by finding on a coverage map the single point where the three lines below intersect:
   a. L12: locus of points where (distance from receiving station via the first satellite 2)−(distance from receiving station via second satellite 3) is equal to (T1−T2) times (speed of light)
   b. L13: locus of points where (distance from receiving station via the first satellite 2)−(distance from receiving station via the third satellite 4) is equal to (T1−T3) times (speed of light)
   c. L23: locus of points where (distance from receiving station via the second satellite 3)−(distance from receiving station via the third satellite 4) is equal to (T2−T3) times (speed of light)
   and correcting the point thanks to calibration, where:
   T1, T2, T3 are the times of arrivals of the signal via the three satellites 2, 3, 4;
   (distance from receiving station via the satellite 2, 3, or 4) means the geometric distance from the point on Earth surface to the position of that satellite, and from that satellite to the corresponding on-ground antenna, plus some 'equivalent distance' to compensate processing time at the satellite and at the receiving station;
   the positions of the satellites 2, 3, 4 are evaluated at the moment when each of them receives the signal from the terminal 1 which can be deducted from time of arrival and known satellite movement;
   (speed of light) is 299.792,459 km/s or its best approximation due to atmospheric effects.

Note that:
1. lines (a) and (b) above already identify a point on the Earth surface with the intersection of L12 and L13. Condition (c) may help to improve accuracy, as in general these lines are "almost" parallel and the uncertainty in time of arrival is translated in a large region;
2. the terminal altitude is not determined by this method—it is assumed that the terminal is on Earth surface and a 3D model of the Earth is used for triangulation;
3. from the geometry, when using GEO satellites, two points are identified, one in the Northern hemisphere, another in the Southern hemisphere. However, usually the three satellites will have restricted coverage to only one of the two possible areas, so the other can be excluded. If this is not the case, a resolution of ambiguity shall be done by additionally analyzing the amplitudes with which the signals are received 6. A procedure of calibration: which can occur as follows: at any moment the system is calibrated to report accurate positions. For example, the satellite distance at any moment has an uncertainty due to the satellite movement and other effects, which should be compensated.
   a. If the receiving station has access to ranging information, this can be used to correct the values used;
   b. the use of 'pilot' signals emitted frequently from known locations and received by the receiving station is recommended;
   c. more in general, there could be a population of trusted terminals that, within each transmitted message, include their precise location (as determined e.g. by GPS). If trusted, this information is then used to correct the residual uncertainty;
   d. Assuming that most terminals are trusted, which is usually the case, the entire population can be used as pilots, simply filtering out the ones with "unexpected" behavior.

Note that, at procedure 4, the exact time at which the message has been transmitted by the terminal is unknown in the general case, as this method is asynchronous and any synchronization would require collaboration from the terminal, as well as much more complexity on it. So the absolute values of T1 or T2 cannot be used directly to determine a locus of points. However, in procedure 5, the relative difference T1−T2 which is independent of the time of transmission, as it depends only on the different paths to the satellites can be used to identify a locus of points, i.e. hyperboloid that intersects the Earth surface. Similarly, T1−T3 and T2−T3 identify two other loci. All the loci intersect in roughly a point with an uncertainty that mainly depends on the accuracy of the measurements.

It will be appreciated that in the method above:
the terminal 1 does not perform any measurement or computation. It just sends a message with its certified identity, so it cannot cheat on its position by performing badly a protocol, the only potential problem would be identity theft, which is addressed through the use of cryptographic techniques. The terminal being simple, it can also be very cheap and suitable for consumer mass-market distribution;
the satellites 2, 3, 4 used are normal telecommunication satellites, that, depending on the usage scenario, may also host normal communication services, which are not affected by the localization system;

all complexity of the system resides at the network operating center. If higher performance is desired, e.g. higher accuracy or real-time localization, a more powerful network operating center can be deployed without touching to the installed base of terminals.

The most complex procedure in the process is procedure 4, i.e. finding the time of arrival on secondary signals coming from satellites 3, 4, which needs the use of a particular message structure as well as a careful link budget assessment.

With respect to the satellites to be chosen, as long as they cover the same region with the same frequency and with a G/T compatible with the link budgets below, it is better to choose satellites as far apart as possible. In fact the accuracy increases with a shorter the chip duration thus larger occupied bandwidth and more spaced satellites. As per preliminary evaluations, using a 5 MHz channel and a location around Paris, an orbital distance of more than 20 degrees corresponds to a localization accuracy of about 200 meters.

Use Cases and Possible Implementations of the Above Method:

Mobile Applications in S-Band.

In this scenario the terminal is mobile, equipped with an omnidirectional S-band transmit (TX) antenna.

Fixed/Mobile Application in C-Band (Low Number of Users)

In this scenario the terminal is fixed, equipped with a low gain omni C-band transmit antenna able to transmit to all the three satellites with approximately the same transmit gain (i.e. the C-band transmitting antenna has a radiation pattern able to send radio-frequency power over 180° in elevation and 360° in azimuth).

It is assumed the terminal is in a location where it is possible to consider a primary satellite (e.g. on main coverage, which means that the G/T with which it is received is quite good) and two secondary (e.g. on secondary coverage). Assuming typical C-band missions, G/T ranges from −3 to −9 dB/K.

The message is assumed to be composed by 50 data bits (containing the secure user identification), FEC (forward error correction algorithm) is Turbo Code with rate 1/3, able to provide about 6 dB of gain, Preamble is made of 25 uncoded bits. The total is so 175 bits, the data transmission rate is assumed 175 bps.

Assuming typical C-band transponder size, 72 MHz has been considered, which allow for a 57.6 Mchip/s chip rate. In order to maximize the auto-correlation peak, the spreading code length has been fixed in $2^{26}-1$ chips (there is practically no repetition within the message duration).

In order to achieve the one chip time of arrival accuracy, it is desirable to maintain the Eb/No, the Eb/No being a different way to address the C/N ratio, representing the ratio of the Energy of a single bit against the Thermal Noise spectral density, for the primary satellite at about 4 dB (corresponding to BER=$10^{-6}$), so as to exploit a perfect demodulation. The following Tables report a synthesis of the obtained Eb/No ranges by varying the User terminal EIRP.

| Satellite | | |
|---|---|---|
| uplink frequency | 6E+09 | Hertz |
| path loss | 200 | dB |
| RX Gain max | 22.5 | dB |
| RX gain min | 15 | dB |
| Repeater noise Figure | 26 | dB/K |
| Channel bandwidth | 72 | MHz |
| No max | −202.6 | dB/Hz |
| User Terminal | | |
| EIRP | 0 | dBW |
| Chip Rate | 57.6 | Mchip/s |
| Bandwidth | 72 | MHz |
| Processign Gain | 55.8 | dB |
| Bit rate (coded) | 150 | bps |
| Link budgets | | |
| C/No min | 17.60 | dB/Hz |
| C/No max | 25.10 | dB/Hz |
| C/N min | −60.97 | dB |
| C/N max | −52.37 | dB |
| Eb/No min | −4.16 | dB |
| Eb/No max | 3.34 | dB |
| Payload bits | 50.00 | |
| Preamble bits | 25.00 | |
| Packet duration | 1.17 | s |
| Time of chip | 0.02 | μs |
| Length of chip | 5.21 | m |
| Possible Code rate length | $2^{26}-1$ | |
| Auto-correlation peak | 78.2678 | dBc |
| Satellite | | |
| uplink frequency | 6E+09 | Hertz |
| path loss | 200 | dB |
| RX Gain max | 22.5 | dB |
| RX gain min | 15 | dB |
| Repeater noise Figure | 26 | dB/K |
| Channel bandwidth | 72 | MHz |
| No max | −202.6 | dB/Hz |
| User Terminal | | |
| EIRP | 10 | dBW |
| Chip Rate | 57.6 | Mchip/s |
| Bandwidth | 72 | MHz |
| Processign Gain | 55.8 | dB |
| Bit rate (coded) | 150 | bps |
| Link budgets | | |
| C/No min | 27.60 | dB/Hz |
| C/No max | 35.10 | dB/Hz |
| C/N min | −50.97 | dB |
| C/N max | −42.37 | dB |
| Eb/No min | 5.84 | dB |
| Eb/No max | 13.34 | dB |

As it can be seen from the above, a 10 dB range for the user terminal EIRP (Effective Isotropic Radiated Power) provides very good coverage to the Eb/No requirement. Assuming a small C-band omni antenna, commercial type, a gain of 3 dB can be assumed, so that the desired user terminal output power ranges between −3 dBW and 7 dBW (500 mW and 5 W).

Fixed/Mobile Application in C-Band (High Number of Users)

This use case upgrades the present method to a multi-user scenario where MAI (Multiple Access Interference) becomes the driving factor to establish the performances.

As reported in the previous use case, the application provides adequate localization accuracy when the Eb/No values for primary and secondary satellites are within a given range. When MAI is considered, an obvious consideration would be to increase the relevant up-link levels to preserve the Eb/(No+Io) values needed for the application. The obvious increase in terms of user terminal output power/antenna TX gain can difficulty be accepted in a commercial environment. As such, the solution needs to be found in some other system-level aspects which could make this system work in a multiple-user scenario.

The desired procedure is the introduction of a multi-user protocol which enables the simultaneous (or pseudo simultaneous) transmission of several users occupying the same channel bandwidth, giving at same time a mean to maintain the system level performance in terms of capacity and localization accuracy within adequate limits.

In order to upgrade the localization system to a multi-user environment, a protocol is proposed incorporating the following procedures:
- a fully asynchronous transmission mode (asynchronous ALOHA or similar, i.e. a method to randomize the transmission instant according to the Aloha protocol) to spread the transmission instant between the different users sharing the same channel;
- a detection method able to identify each message in the overlapped environment (making use of preamble or similar);
- an iterative approach for interference cancellation (SIC or similar, i.e. Successive Interference Cancellation as used in ETSI S-MIM protocol) to boost the capacity of the shared channel when in multi-user;

The above points could be implemented in a first instance by adopting the ETSI-MIM asynchronous messaging protocol defined in ETSI TS 102 721-3, although important upgrades could be added to the overall algorithm for the sake of maximizing the localization accuracy in the multi-user scenario.

The trade-offs relevant to the System level parameters in view of optimizing at same time localization accuracy and system capacity (number of simultaneous users) are specific to the deployed system and are not part of the present invention.

Fixed Application in Ku/C-Band (High Number of Users)

This use case extends the geolocalization method to fixed users who are already served by a Ku down-link (such as TV market) for the sake of permitting service providers to know their geographical localization.

This use case assumes the adoption of a small C transmitter in a fixed Ku-band VSAT (80 cm receiving parabola or similar). The installation would require a minimal reworking consisting in installing a small C band TX section+feed on the mast supporting the Ku band RX feed, without degrading at all the receiving performance of the terminal.

The benefits of such an installation are several. Taking chance of the possibility to transmit in C band, the payload messages could be used for various needs:
- localization of the terminal trough phase determination;
- messaging system from the user terminal to the service provider, for a wide range of services;
- two-way automatic configuration of the terminal itself by mean of the Ku reception and the C band transmission.

More in terms of technical details, the adoption of a small C band TX section, i.e. less than 1 W with a parabolic reflector 80 cm wide would permit to have comprehensive TX gain towards the three different satellites, provided they are in the visibility range of the antenna (main lobe+side lobes). As an example, the FIG. 2 shows the typical radiation pattern of an 80 cm dish used for C band transmission.

Figure 2:
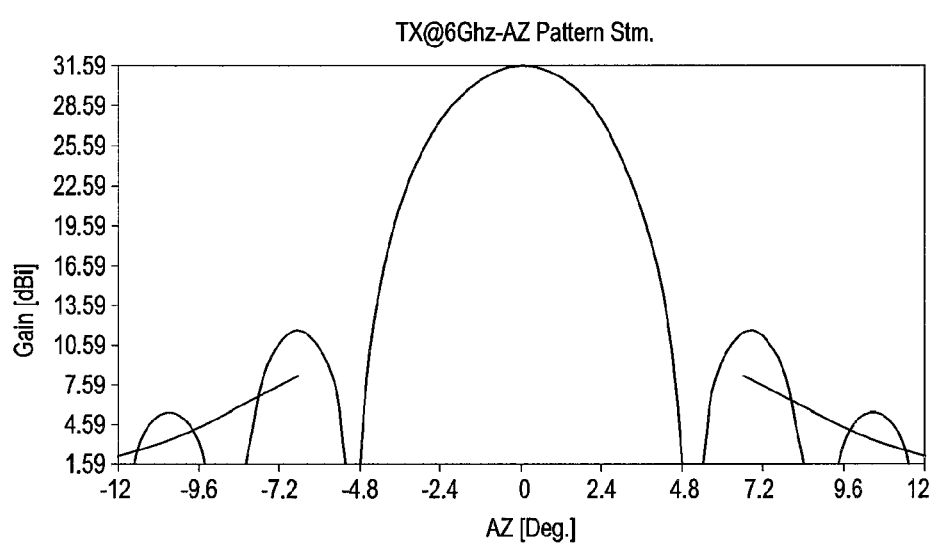
FIG. 2 represents the typical radiation pattern of an 80 cm dish used for C band transmission.

As it can be seen on FIG. 2, the main, primary and secondary lobes are suitable for being used in the application. By assuming a transmit output power of 500 mW (−3 dBW) and an EIRP threshold of 0 dBW for the secondary satellite (as shown in first use case), it is enough to avoid that the secondary satellite lies into a radiation null. This occurrence can eventually be corrected by tilting the C-band TX feed towards the parabola, with a decrease of the boresight gain and a general depointing of the total radiation pattern, so permitting to avoid that a secondary satellite falls inside a null.

Worked Out Example

The exact parameters to be used in a real deployment depend on a multitude of factors. As a general reference, preliminary simulations have been carried out using the E-SSA waveform in a 5 MHz channel. In this setting, the C/N required on the primary satellite is about −25 dB, and on the secondary satellite is about −40 dB. This difference of 15 dB shall compensate the difference in G/T of the satellites towards the user location, and of the user antenna gain towards the two satellites. In these conditions it is possible to determine the TOA with a single chip precision, and at the same time estimate the power within 0.5 dB (useful for combining results of this invention with results on the invention of the document FR no 1154663). If the C/N difference is more than 15 dB, a different waveform can be used in order to have a larger dynamic range.

We show a worked out example under the assumptions that the link budget satisfies the above requirement, and having three GEO satellites located at 5° West, 10° East and 70° East.

Figure 3:
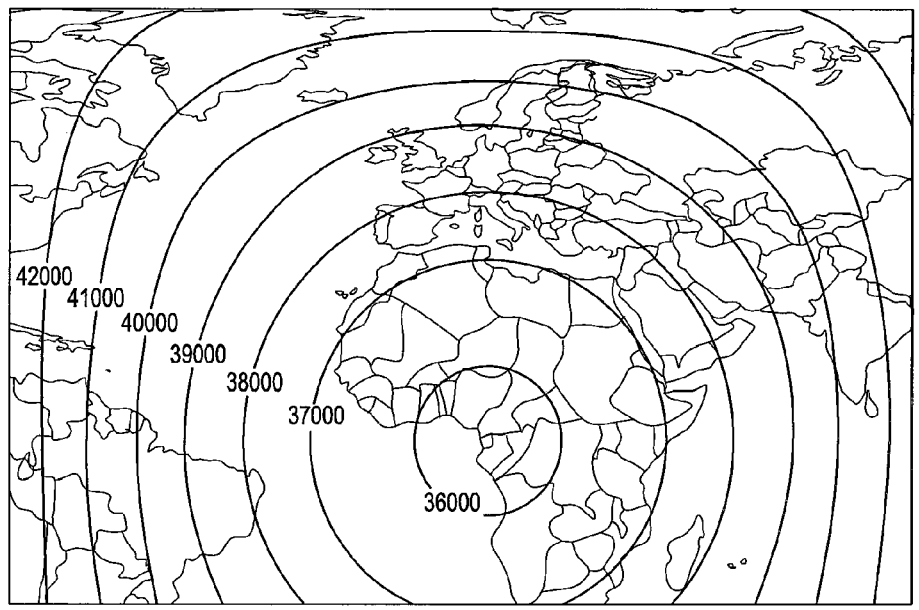
FIG. 3 shows the distance in kilometers of various points on the Earth from a GEO satellite S1 located at 10° East in geostationary orbit, and used for implementing a method according to an embodiment of the invention.
Figure 4:
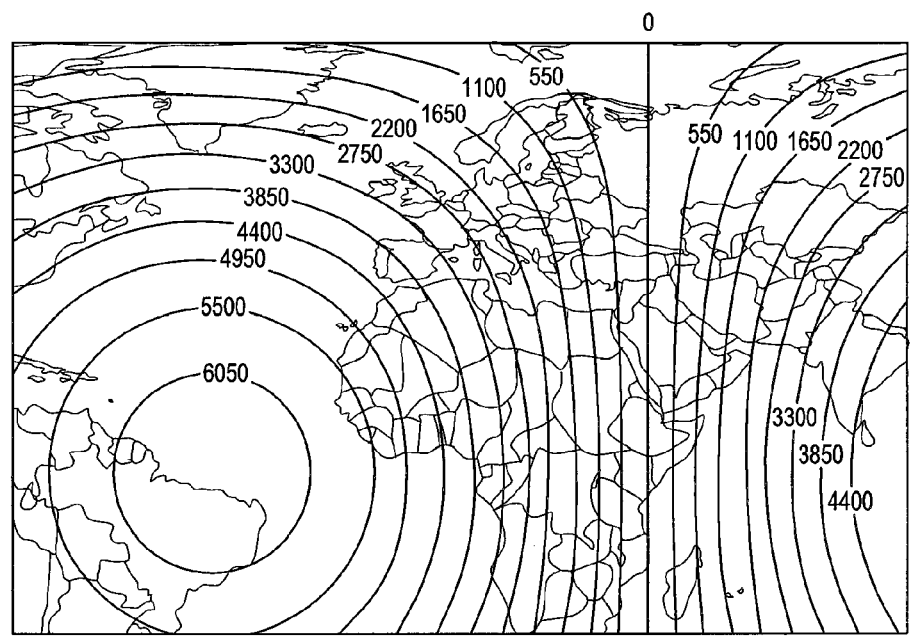
FIG. 4 shows, for each point of the Earth, the difference in kilometers between the distance from S1 and the distance from a second satellite S2 located at 70° East in geostationary orbit.

FIG. 3 shows the distance in kilometers of various points on the Earth from a GEO satellite S1 located at 10° East.

Assuming a satellite S2 is located at 70° East, FIG. 3 shows, for each point of the Earth, the difference in kilometers between the distance from S1 and the distance from S2.

When a terminal transmits a signal, the network operating center can measure time of arrival via S1, via S2, via S3, i.e. TOA-S1, TOA-S2, TOA-S3. Their absolute values are not significant, because, not knowing the exact time when the signal was transmitted, they cannot be used directly to compute the distances from S1, S2 or S3.

However, (TOA-S1−TOA-S2) is proportional to the difference of the distances of the terminal from S1 and from S2. Therefore the NOC to calculate on which line the terminal is located.

Figure 5:
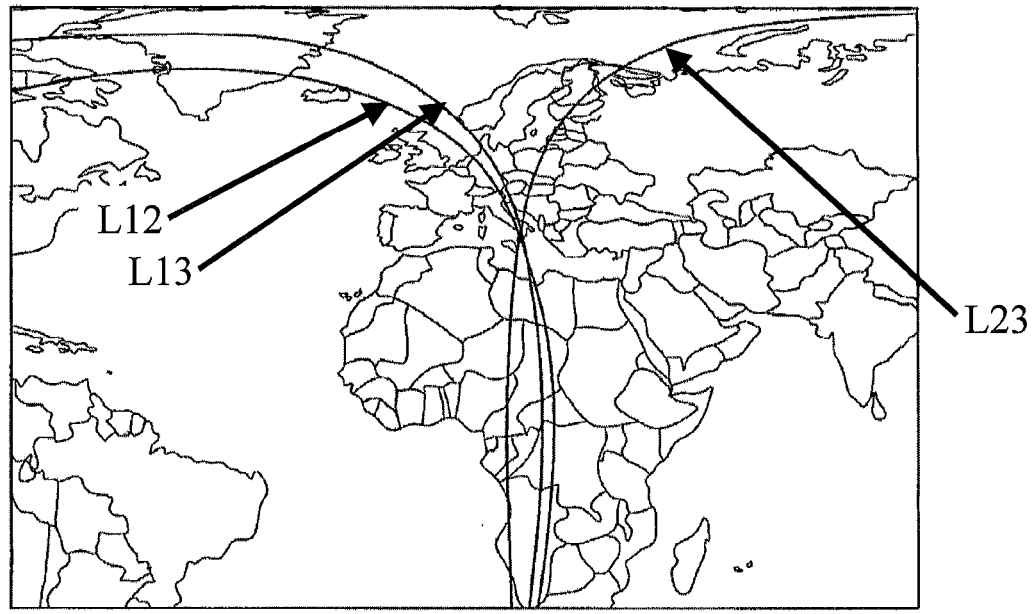
FIG. 5 shows some lines of position obtained by a method according to an embodiment of the invention.

Assuming for example that
(TOA-S1−TOA-S2) corresponds to 323 km
(TOA-S1−TOA-S3) corresponds to −1995 km
(TOA-S2−TOA-S3) corresponds to −2318 km It is possible to draw the following lines, and determine that the terminal should be located at (one of) their intersection(s) as shown on FIG. 5.

Figure 6:
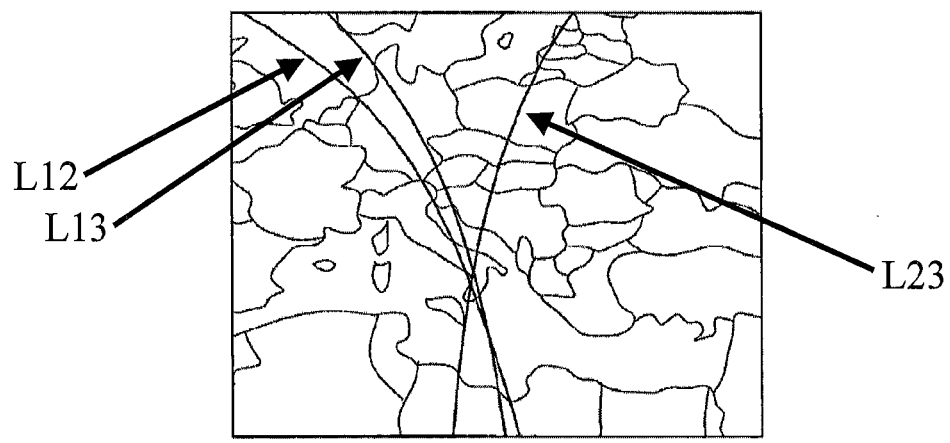
FIG. 6 shows some other lines of position obtained by a method according to an embodiment of the invention.

As stated in the description, there is one possible point in the Northern hemisphere, and a second in the Southern hemisphere. Usually they can be distinguished thanks to different received power, for example. The point on the Northern hemisphere corresponds to the town of Linguaglossa (37° 51' N, 15° 08' E) as shown on FIG. 6.

While the present invention has been particularly described with reference to the preferred embodiments, it should be appreciated by those of ordinary skill in the art that changes and modifications in form and details may be made without departing from the scope of the invention. Thus instead of using three satellites and the times of arrival, we could use two satellites and the amplitudes and times of arrival of the signals.

The invention claimed is:

1. A method for localizing a terminal adapted to send a signal to a first satellite, the method using at least a second satellite, the method comprising:

(a) transmitting the signal by the terminal;
(b) receiving the signal by the first and the second satellites;
(c) approximating positions of the first and second satellites;
(d) transmitting the signal from each of the first and second satellites to a receiving station;
(e) demodulating, at the receiving station, the signal received via the first satellite with a first carrier power to noise and/or interference power ratio to:
   determine content of the signal; and
   determine a first time of arrival of the signal at the receiving station after minimization of inaccuracies due to:
      satellite frequency error,
      satellite Doppler due to orbital box movement, and
      time to transfer of the signal through a transponder of the first satellite by using information relevant to the first satellite retrieved via pilot signals;
(f) determining a second time of arrival of the signal received at the receiving station via the second satellite with a second carrier power to noise and/or interference power ratio by using the signal content and properties of the demodulated signal after correction at the second satellite of satellite frequency error and satellite Doppler, which are known by means of the pilot signals, wherein the determined signal content comprises a spreading code obtained from the demodulation of the signal received via the first satellite, and wherein the second ratio is less than the first ratio; and
(g) geo-localizing a set of possible positions of the terminal by using the approximate positions of the first and second satellites and a difference of the first and second times of arrival of the signal received by the receiving station via the first and the second satellites.

2. The method according to claim 1, wherein the signal is a short duration signal.

3. The method according to claim 2, wherein a duration of the signal is less than 1 second when emitted.

4. The method according to claim 1, wherein the signal includes at least a terminal identifier.

5. The method according to claim 4, wherein the terminal identifier includes a cryptographic element.

6. The method according to claim 5, wherein the cryptographic element is a digital signature of a portion of the signal content or a sequence generated via a secret seed.

7. The method according to claim 1, wherein the receiving station comprising:
a first receiving part to which the signal coming from the first satellite is transmitted, and
a second receiving part to which the signal coming from the second satellite is transmitted.

8. The method according to claim 1, wherein the receiving station comprises a processing unit that performs operations (e), (f), and (g).

9. The method according to claim 1, further comprising receiving pilot signals usable to determine precise positions of the satellites.

10. The method according to claim 1, further comprising detecting the signal received by the receiving station via the second satellite by using the determined signal content.

11. The method according to claim 1, further comprising:
receiving the signal by a third satellite,
determining a third time of arrival of the signal received from the terminal at the receiving station via the third satellite by using the determined signal content; and
geo-localizing the position of the terminal by using the first, second, and third times of arrival of the signal.

12. The method according to claim 1, wherein the signal is received via two different satellites, the method further comprising:
computing two or more of:
   a first amplitude of the signal received via the first satellite;
   a second amplitude of the signal received via the second satellite;
   a third amplitude of the signal received via a different beam of the first satellite; or
   a fourth amplitude of the signal received via a different beam of the second satellite;
computing either a first difference of the first and second amplitudes, a second difference of the first and third amplitudes, or a third difference of the second and fourth amplitudes; and
geo-localizing the position of the terminal by using:
   the difference of the first and second times of arrival of the signal received by the receiving station via the first and the second satellites; and
   the first, second, or third difference, knowing coverage maps of the two satellites and of the different beams.

13. The method according to claim 1, wherein the signal is transmitted from the terminal with a radio frequency (RF) power less than 5 Watts in spread spectrum.

14. The method according to claim 1, wherein the positions of the first and second satellites are approximated at a moment when each of the satellites receives the signal.

15. A system for localizing a terminal, the terminal being configured to send a signal, the system comprising:
a first satellite configured to receive the signal from the terminal and to transmit the signal to a receiving station;
a second satellite configured to receive the signal from the terminal and to transmit the signal to the receiving station; and
the receiving station configured to receive the signal emitted by the first and second satellites and to receive approximate positions of the first and second satellites, wherein the receiving station comprises a processing unit configured to:
   demodulate the signal received via the first satellite with a first carrier power to noise and/or interference power ratio to:
      determine content of the signal; and
      determine a first time of arrival of the signal at the receiving station, after minimization of inaccuracies due to:
         satellite frequency error,
         satellite Doppler due to orbital box movement, and
         time to transfer of the signal through a transponder of the first satellite;
      by using information relevant to the first satellite retrieved via pilot signals;
   determine a second time of arrival of the signal received at the receiving station via the second satellite with a second carrier power to noise and/or interference power ratio by using the signal content and properties of the demodulated signal after correction at the second satellite of satellite frequency error and satellite Doppler, which are known by means of the pilot signals, wherein the determined signal content comprises a spreading code obtained from the demodulation of the signal received via the first satellite, and wherein the second ratio is less than the first ratio; and
geo-localize a set of possible positions of the terminal by using the approximate positions of the first and second satellites and a difference of the first and second times of arrival of the signal received by the receiving station via the first and second satellites.

16. A method for localizing a terminal adapted to send a signal to a first satellite, the method using at least a second satellite, the method comprising:
receiving the signal by the first and the second satellites from the terminal;
receiving pilot signals usable to determine precise positions of the first and second satellites;
transmitting the signal from each of the first and second satellites to a receiving station;
demodulating the signal received via the first satellite with a first power to:
determine a signal content and determine a first time of arrival of the signal at the receiving station after minimization of inaccuracies due to:
satellite frequency error,
satellite Doppler due to orbital box movement, and
time to transfer of the signal through a transponder of the first satellite by using information relevant to the first satellite retrieved via pilot signals;
determining a second time of arrival of the signal received at the receiving station via the second satellite with a second power by using the signal content and properties of the demodulated signal after correction at the second satellite of satellite frequency error and satellite Doppler, which are known by means of the pilot signals, wherein the determined signal content comprises a spreading code obtained from the demodulation of the signal received via the first satellite, and wherein the second ratio is less than the first ratio; and
geo-localizing a set of possible positions of the terminal by using the precise positions of the first and second satellites and a difference of the first and second times of arrival of the signal received by the receiving station via the first and the second satellites.

* * * * *